United States Patent [19]

Speich

[11] 4,452,281

[45] Jun. 5, 1984

[54] COUPLING ARRANGEMENT USABLE IN A TEXTILE MACHINE

[75] Inventor: Francisco Speich, Gipf-Oberfrick, Switzerland

[73] Assignee: Textilma AG, Hergiswil, Switzerland

[21] Appl. No.: 389,550

[22] Filed: Jun. 17, 1982

[30] Foreign Application Priority Data

Jun. 26, 1981 [CH] Switzerland ............... 4234/81

[51] Int. Cl.³ ............................................ D03C 1/00
[52] U.S. Cl. ............................................ 139/76
[58] Field of Search .................... 139/76, 66 R, 71

[56] References Cited

U.S. PATENT DOCUMENTS

| 4,354,531 | 10/1982 | Surkamp et al. | 139/66 R |
| 4,367,770 | 1/1983 | Schwarz | 139/66 R |

FOREIGN PATENT DOCUMENTS

| 2909131 | 9/1980 | Fed. Rep. of Germany | 139/76 |
| 445774 | 2/1949 | Italy | 139/66 R |
| 486413 | 11/1953 | Italy | 139/66 R |

*Primary Examiner*—James Kee Chi
*Attorney, Agent, or Firm*—Toren, McGeady and Stanger

[57] ABSTRACT

In a coupling arrangement for use in a textile machine, a drive shaft can be intermittently rotated and a connecting member encircles and is connected to the drive shaft by an eccentric hoop located between them. A coupling key is displaceable between a coupling recess associated with the drive shaft and a coupling recess associated with the connecting member. The coupling key is retained in the recesses by lead cams. A shifting ring displaces the coupling ring alternately between the coupling recesses. The shifting member can be pivoted between two positions and a spring biases it into one of the positions. A control device moves the shifting member between its two positions. The control device includes a rotatable shaft with a rocking lever fixed to it. The rocking lever engages the shifting member for moving it from one position to the other against the biasing action of the spring. The control device includes a control part and based on the state of the control part the shifting member can be moved or held in place. The rocking lever performs one reciprocal motion for each cycle of a shedding unit and, accordingly, during each cycle the control of the shifting ring is effected for locating it in one of its positions.

14 Claims, 20 Drawing Figures

COUPLING ARRANGEMENT USABLE IN A TEXTILE MACHINE

CROSS-REFERENCE TO RELATED APPLICATIONS

Application Ser. No. 335,878 filed Dec. 30, 1981 by Francisco Speich for COUPLING ARRANGEMENT USABLE IN A TEXTILE MACHINE.

SUMMARY OF THE INVENTION

The present invention is directed to a coupling arrangement usable in a textile machine including a first drive shaft capable of intermittent rotation about its axis. A connecting member extends around the drive shaft with an eccentric hoop located between the drive shaft and the connecting member. A coupling part or key is movably guided on the eccentric hoop for movement approximately radially of the drive shaft. The coupling key can be moved between a first coupling recess in the drive shaft and a second coupling recess in the connecting member. A shifting ring displaces the coupling part alternately between engagement with the first and second coupling recesses. Lead cams guide the coupling part and retain it within the recess in which it is positioned. The shifting member is supported eccentrically relative to the drive shaft and is arranged to be pivoted about its support between a first position and a second position. A spring biases the shifting member to the first position and a control device pivots the shifting member between the first and second positions.

Such coupling arrangements are known, note the German Auslegeschrift No. 20 36 643. In this known device control is effected by a pattern card scanned by reading needles. The needles are arranged on carriers and are pressed by springs via a stationary lock against the pattern card. When a reading needle penetrates the hole in the pattern card, the corresponding carrier is moved forwardly so that a projection on the carrier extends transversely of a rocking lever which pushes the carrier and, accordingly, the reading needle forward on the pattern card. The carrier moves a shifting ring against the force of a prestressed spring by means of a tension element with an equalizing spring. The shifting ring is then moved back and forth by the prestressing spring or by the carrier connected to the shifting ring via the equalizing spring. Since the shifting ring is moved by spring elements into the two shifted positions, an inaccurate placement of the shifting ring may take place counteracting the coupling key so that erroneous shifting results. The spring system may have resonance of vibrations limiting the driving speed of the drive shaft. Moreover, the control device is relatively complicated and thus subject to problems. Further, the control device is a relatively large mass and, as a consequence, is slow thereby limiting the driving capacity. Finally, the control using pattern cards involves disadvantages which are well known.

Therefore, it is the primary object of the present invention to provide a coupling arrangement of the type mentioned above so that it does not have the mentioned disadvantages, it functions with fewer parts, exact control is possible for retaining the shifting ring in the shifted positions so that the control device is simpler, it is less subject to wear, and has smaller inertia forces permitting higher driving speeds.

In accordance with the present invention, the control device includes a drive shaft rotatably mounted on a support. A rocking lever is fixed to the drive shaft so that it rotates with it. The rocking lever has a driving surface arranged to engage the shifting ring for displacing the ring from a first position to a second position against the biasing action of the ring. A pawl engages the shifting member against the biasing action of the spring so that, depending on the state of the control part, the pawl effects one of moving the shifting member in the second position, holding the shifting member in the second position or moving the shifting member to the first position. Since the control device includes a rocking lever, stationary relative to the drive shaft, the lever swings back and forth once during each cycle of the shedding unit of a textile machine and acts directly on the shifting ring via a driving surface affording an extremely simple construction of the control involving few driving parts. The pawl interacts with a notch in the shifting ring and provides at least one fixed shifted position disposed in a form-locking manner so that yielding of the coupling key is prevented. In addition, the shifting ring is biased toward the driving surface on the rocking lever and also for engaging the pawl with the shifting ring whereby the pawl holds or releases the shifting ring depending on the state of the control part. In addition, an extremely simple control of the shifting ring is afforded.

In one embodiment of the present invention the pawl is rotatably supported on a pin fixed to a support. The pawl is stationary and the movement of the shifting ring is effected only by the rocking lever. In this case, the second shifted position is clearly defined by the engagement of the pawl with the shifting ring. Where the pawl is rotatably supported on a pin positioned on the rocking lever, the pawl is moved at the same time with the rocking lever, however, the driving direction of the pawl and the engagement surface of the rocking lever are opposite. In a center position between the first and second shifted positions, the return motion of the shifting ring which is effected by the biasing action of the spring against the pawl, can be replaced by the return motion of the rocking lever. The center position of the shifting ring may be used as a decisive position in such a way that, in dependence on the shifted state of the control part, the engagement is loosened and the shifting ring follows the return motion of the rocking lever, or that the engagement between the pawl and the shifting ring is maintained and during the return motion of the shifting lever the pawl returns the shifting ring back into the second shifted position.

The pawl may be moved by the control part for both engagement and disengagement. In one embodiment, however, it is advantageous if the pawl is constantly biased toward the shifting ring with the control part only being activated for disengagement.

In an embodiment of the coupling arrangement where the control part is set relative to the pawl, a very fine adjustment of the control part is possible.

While in the coupling arrangement the control part can be activated mechanically or pneumatically, an embodiment where the control part is electromagnetically operated is advantageous. Particularly when the pawl is biased toward the shifting ring, it is sufficient when the electromagnetic control part forms a driving movement in one direction only. In addition, the design of the electromagnetic control part permits the use of modern program units, such as electronic storage units and electronic controls, such as magnetic tape controls whereby mechanical control units with paper or plastic pattern cards are not needed. Additionally, in electronic controls the shifting times can be set in a much simpler manner and more accurately. Such an arrangement is particularly advantageous at very high rotational speeds.

The electromagnetic control part can be arranged so that it pulls the pawl or an intermediate lever out of the stop position. If necessary, additional means can be provided to move the intermediate lever or the pawl toward the control part. Another embodiment is advantageous where the scanning of the control part is controlled directly by the movement of the rocking lever and, consequently, the shifting ring, so that the requirements for synchronization between the control part and the drive may be less and possible fluctuations in the drive have no disadvantageous effect on the control.

In another embodiment a stop cam is provided on the rocking lever and when the shifting ring and the rocking lever are in the first shifted position, the stop cam interacts with a shoulder on the shifting ring and blocks the shifting ring from yielding toward the second shifted position. This embodiment is particularly advantageous because a form-locking position of the shifting ring in the first shifted position is established and the safety of the shifting operation is improved.

It is possible to construct the coupling arrangement so that the shifting ring effects a forced movement of the coupling key toward the drive shaft as well as toward the connecting member. In an arrangement of the coupling member where the coupling key is biased against the drive shaft by a spring and has an engagement cam interacting with a control cam on the shifting ring in the direction of the initial stressing force of the spring, it is advantageous because the construction of the shifting ring, the coupling part and the shifting process are simplified. It is also advantageous to construct the coupling arrangement with an automatic shifting retaining key positioned in the eccentric hoop with the retaining key independent of the coupling key and being slidable at least approximately radially. The retaining key engages automatically in at least one retaining recess interacting with the drive shaft or into at least one other retaining recess interacting with the connecting member. The retaining key and/or its recesses have control surfaces which aid in the displacement of the retaining key out of the recess when the drive shaft overtakes the eccentric loop or the eccentric hoop overtakes the connecting member and when the retaining key is opposite its recess. Such an arrangement is advantageous, since the coupling key is relieved of clamping forces during the shifting process.

In summary, a number of decisive advantages are achieved with the coupling arrangement of the present invention.

Since the shifting ring is held in both shifted positions in a force-locking and form-locking manner against the control force of the coupling key, the control is independent of the resistance with which the coupling part opposes the control movement. Greater operational safety of the coupling arrangement is achieved and a significant increase in speed is possible.

The coupling arrangement is also distinguished by an extremely small number of levers and points of rotation so that the possibility of wear is significantly reduced and, at the same time, the ease of operation and repair are increased. With a limited number of parts, there are less inertia forces making a higher capacity of coupling arrangement possible. The limited number of parts also results in an economical manufacture of the coupling arrangements.

Particularly, the electromagnetic control part provides for an extremely simple control, as mentioned above.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
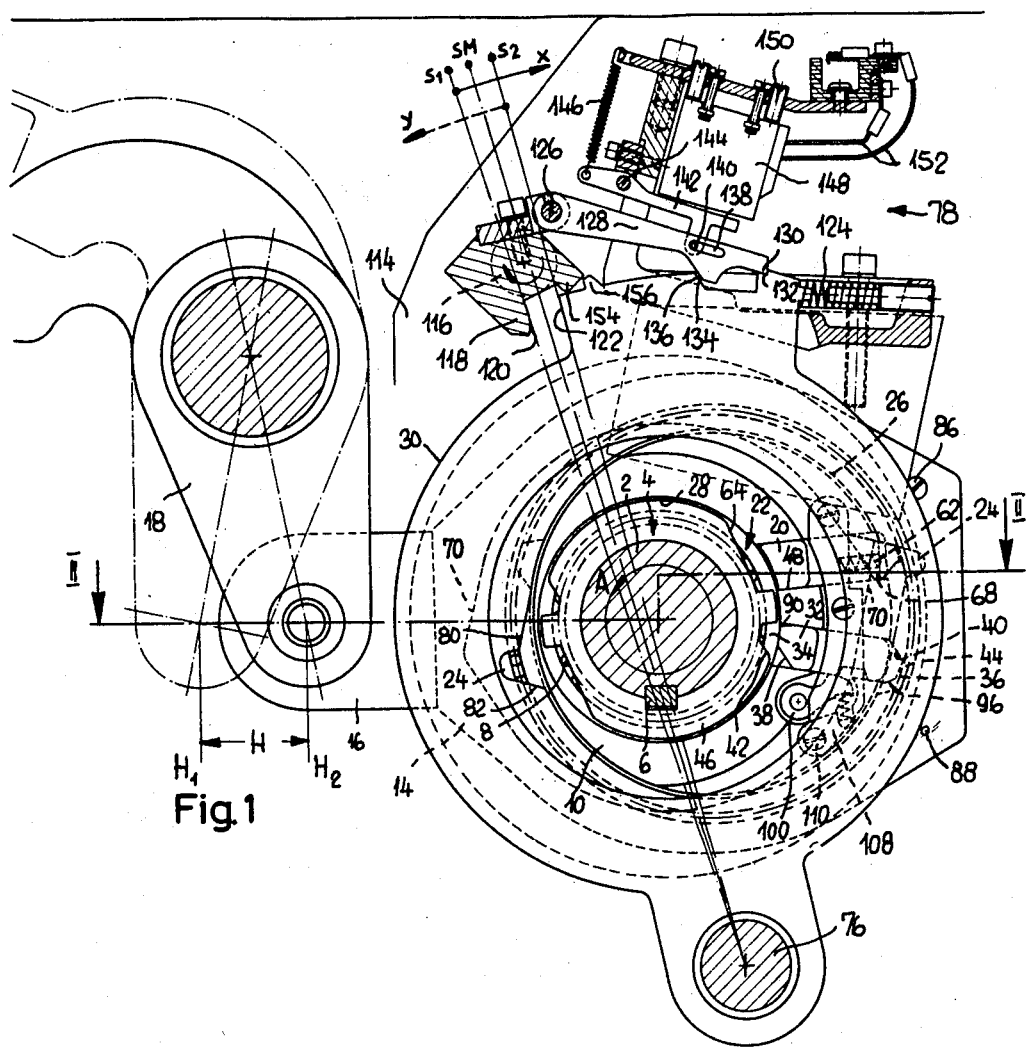
FIG. 1 is a side view, partly in section of a coupling arrangement embodying the present invention with a control device for the drive shaft and with the shifting ring located in the second position.
Figure 2:
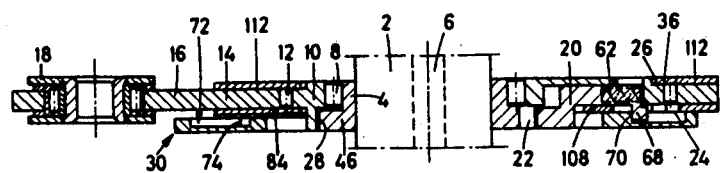
FIG. 2 is a sectional view taken along the line II—II of FIG. 1.

In FIGS. 1 to 4, the coupling arrangement of the present invention is illustrated and includes a drive shaft 2 which can be rotated intermittently so that after each passage through 180°, the shaft comes to a complete stop or nearly to a stop. A circular bearing 4 is fixed on the drive shaft 2 by a key 6 so that the bearing and the shaft rotate as a unit. A roller bearing 8 encircles the circular bearing and an eccentric hoop 10 is mounted on the roller bearing. Another roller bearing 12 is spaced radially outwardly from the roller bearing 8 and supports a ring-shaped connecting member 14 so that it fits around the eccentric hoop. The connecting member 14 includes a connecting arm 16 articulated to an oscillating member 18 which drives a shaft, not shown in any further detail. With the coupling arrangement it is possible for the connecting arm 16 to perform a reciprocating movement H between the points $H_1$ and $H_2$. A coupling key 20 couples the eccentric hoop to the drive shaft or interconnects the eccentric hoop with the connecting member. Accordingly, coupling key 20 is alternately engageable into at least one coupling recess 22 formed in the drive shaft 2 and at least one coupling recess 24 formed in the connecting member 14. Rather than being formed in the drive shaft and the connecting member, the recesses can be associated with them. Lead cams 26, 28 guide the coupling key between the coupling recesses 22, 24. During rotation, the lead cams 26, 28 prevent disengagement of the coupling key out of the coupling recess within which it is seated. Coupling key 20 is guided in the radial direction between the radially inner coupling recess 22 and the radially outer coupling recess 24 on the connecting member. A shifting ring 30 which can be moved in a conventional manner serves to control the position of the coupling key 20. In addition, a retaining key 32 is separate from the coupling key 20 and is spaced angularly from it around the drive shaft. Retaining key 32 is supported on the eccentric hoop 10 and is movable approximately radially of the drive shaft. The retaining key 32 is effective to counter the driving diriction A of the drive shaft 2. Displacement of the retaining key is effected automatically based on the position of the coupling key 20. Retaining key 32 is displaceable between at least one retaining recess 34 associated with the drive shaft 2 and another retaining recess 36 associated with the connecting member 14. By displacing the retaining key 32 in the radial direction it can be moved between the radially inner recess 34 and the radially outer recess 36. Control surfaces 38, 40 are located on the radially inner and radially outer ends of the retaining key 32 while corresponding control surfaces 42, 44 are formed in the radially inner retaining recess 34 and the radially outer retaining recess 36. These control surfaces effect the displacement of the retaining key out of one or the other of the retaining recesses when the drive shaft 2 overtakes the eccentric hoop or the eccentric hoop overtakes the connecting member 14 with the retaining key positioned opposite the respective recess. Further, the lead cams 26, 28 guide the retaining key against disengagement when secured within one of the retaining recesses 34, 36.

In the illustrated embodiment, the coupling arrangement affords two positions spaced angularly 180° apart where it is possible to couple the eccentric hoop to the drive shaft. Consequently, there are two coupling recesses 22, 24 as well as two retaining recesses 34, 36 with each pair spaced angularly apart by 180°.

The coupling recesses 22 and the retaining recesses 34 associated with the drive shaft 2 are formed in a radially extending flange 46 on the circular ring 4. Further, the radially inner lead cam 28 extends circumferentially around the radially extending flange 46. In addition, radial flange 46 limits the roller bearing in the radial direction.

Figure 4:
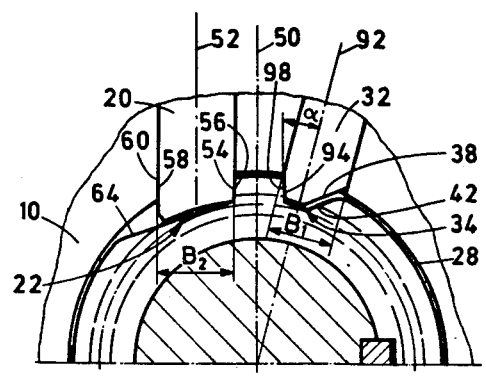
FIG. 4 is a detail view of the arrangement of the coupling key and the retaining key in the drive shaft.

Coupling key 20 is movably supported in a groove 48 in the eccentric hoop. As shown in FIG. 4, the coupling key 20 is movable parallel to a line 50 extending radially outwardly from the drive shaft. Radial line 50 is spaced approximately equidistantly between the coupling key 20 and the retaining key 22. As indicated in FIG. 4, coupling key 20 has a side 54 approximately parallel to the direction of displacement 52 of the key. This direction of displacement extends in parallel relation with the line 50 so that the direction of displacement forms a chord across the drive shaft 2. Coupling side 54 is in juxtaposition with a coupling side 56 in the coupling recess 22. A supporting side 58 of the coupling key 20 opposite the side 54 extends along a corresponding support surface 60 formed in the eccentric hoop 10. Coupling key 20 is spaced laterally from the radial line 50 so that the side 56 in the coupling recess 22 is approximately parallel to the support surface 60 in the eccentric hoop 10. With this arrangement, an optimum power transfer is achieved and flexural stress in the coupling key is avoided.

Figure 5:
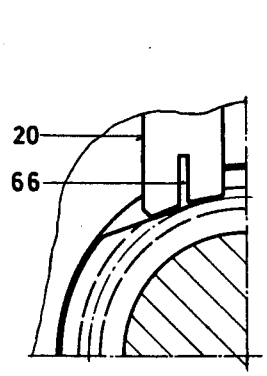
FIG. 5 is a view similar to FIG. 4 illustrating another embodiment of the coupling key.

A biasing spring 62 is located between the coupling key 20 and the eccentric hoop 10 and directs the coupling key toward the drive shaft to assure the engagement of the key into the coupling recess 20 associated with the drive shaft when the shifting ring is in a coupling position. As can be seen in the drawing, particularly in FIGS. 4 and 7, each coupling recess 22 associated with the drive shaft 2 has an approximately tangential feed-side surface 64 for permitting a smooth engagement of the coupling key into the coupling recess 22. This smooth engagement is facilitated by biasing spring 62 which supports the coupling action. In another embodiment of the coupling key, as shown in FIG. 5, the key has a slit 66 open into the coupling recess and the slit provides the coupling key with a springy characteristic which softens the engagement of the key in the coupling recess.

Figure 3:
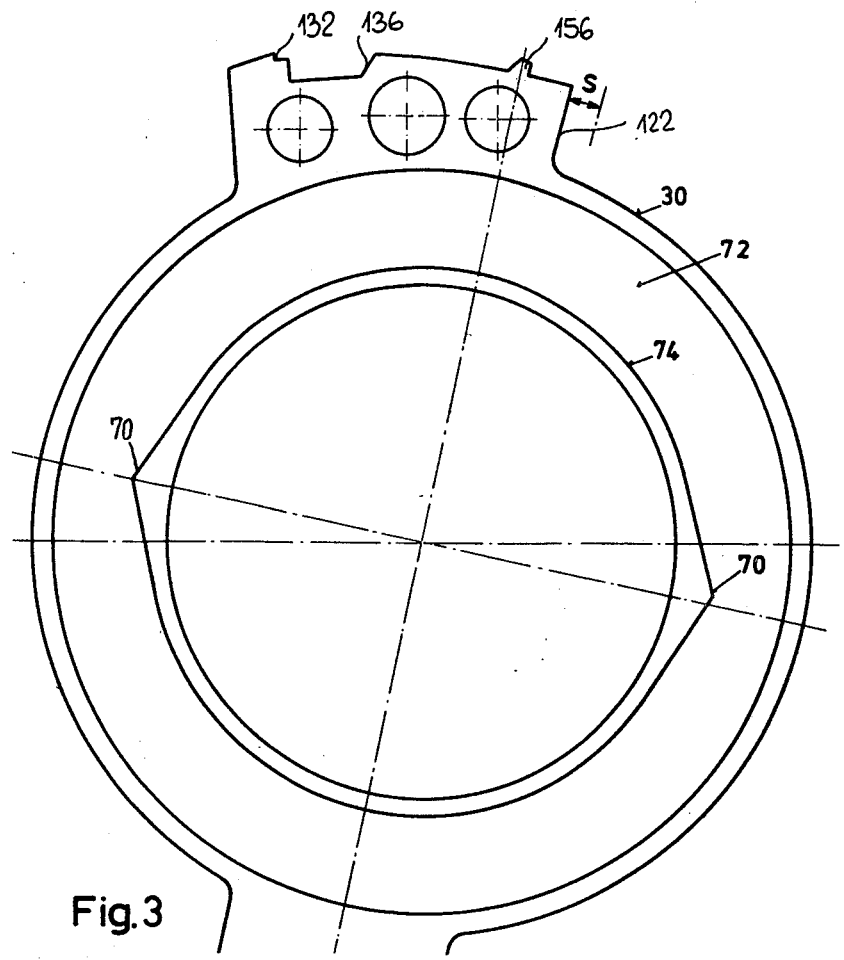
FIG. 3 is a view of the shifting ring of the coupling arrangement.

A driver cam 68 is secured to and extends laterally outwardly from the coupling key 20 and interacts with control cams 70 on the shifting ring 30, note FIG. 3, for effecting the disengagement of the coupling key out of the coupling recess on the drive shaft.

Accordingly, shifting ring 30 covers or extends over the travel path of the driver cam 68 and has a guide groove 72 which extends over the travel path of the driver cam and the driver can moves in the guide groove. The radially inner side 74 of the guide groove 72 contains the control cams 70. As shown in FIG. 1, an outwardly protruding part on the shifting ring is pivotally supported on a pin 76 parallel with but spaced from the axis of the drive shaft. A control device 78 described in detail below, serves to pivot the shifting ring through the path S.

At its end facing outwardly away from the drive shaft 2, the coupling key 20 is engageable within the coupling recesses 24 associated with the connecting member 14. Coupling recess 24 has an approximately tangential feed-side surface 80, note FIG. 6, and an inclined outlet side surface 82 which facilitates engagement. Lead cam 26 extends from the feed-side surface 80 and runs into the outlet side surface 82. Coupling recess 24 and lead cam 26 are formed in a ring 84 supported on a lateral surface of the connecting member 14 and projecting radially inwardly toward the drive shaft 2, note FIG. 2. In addition, ring 84 serves to support the connecting member 14 and the roller bearing 12 on the eccentric hoop 10. Ring 84 is secured to the connecting member 14 by bolts 86 and pins 88. The bolts 86 and pins 88 are shaped as safety-shearing members and shear when the coupling key 20 prevents proper operation.

Retaining key 32 is also movably supported in a groove 90 in the eccentric hoop with the direction of displacement extending basically radially of the drive shaft 2, note FIG. 4. The radially inner force application side 94 of the retaining key facing the drive shaft and the radially outer force application side 96 facing the connecting member 14 form an acute angle $\alpha$ with the direction or line of displacement 92 of the retaining key. Due to this orientation of the force application surfaces, the retaining key exerts a wedging effect so that with the coupling key engaged in a corresponding coupling recess there is no play. The radially inner force application surface or side 94 on the retaining key 32 facing the drive shaft 2 and the juxtaposed side 98 of the radially inner retaining recess 34 are approximately parallel to the radial line 50 located between the coupling key 20 and the retaining key 32, note FIG. 4. With this arrangement, an optimum power distribution is possible. As can be seen in FIG. 4, the width $B_2$ of the coupling key 20, that is the dimension in the circumferential direction of the drive shaft 2 is greater than the width $B_1$ of the retaining recess 34 so that it is not possible for the coupling key to engage within the retaining recess 34.

As illustrated best in FIGS. 6–13, a pawl 100 is pivotally supported on the eccentric hoop alongside the retaining key 32 and is biased by a spring 102 against the adjacent radially extending side of the key. When the retaining key 32 is disengaged from the retaining recess 34, nose 104 on the pawl 100 acts approximately perpendicularly on the adjacent side of the retaining key 32. The frictional force developed by this interaction prevents any involuntary or accidental displacement of the retaining key in the direction of the retaining recess 34 in the drive shaft 2. On the other hand, if the retaining key 32 is engaged within the retaining recess 34, nose 104 extends into a recess 106 in the adjacent side of the retaining key and biases the retaining key toward the retaining recess 34. As a result, accidental displacement of the retaining key 32 from the retaining recess 34 is prevented. The pawl 100 along with the retaining key 32 and the coupling key 20 are held on the eccentric hoop by a holding plate 108. The holding plate 108 is secured to the eccentric hoop 10 by bolts 110. Note FIGS. 1 and 2.

Retaining recess 36 associated with the connecting member 14 is located in a ring 112 provided on one surface of the connecting member 14 on the opposite side from the ring 84 which contains the radially outer coupling recess 24 for the coupling key 20. A circumferentially extending edge of the ring 112 forms the lead cam 26 serving as the guide for the retaining key 32. Further, ring 112 acts as a guide for the connecting member 14 and for the roller bearing 12 on the eccentric hoop 10.

As distinguished from the illustrated embodiment, it is possible not to connect the rings 84, 112 with the connecting member 14, but to arrange them concentrically to the drive shaft and secure them in a stationary position on a housing, not shown.

The manner in which the coupling arrangement operates is described in more detail with respect to FIGS. 6 to 13.

Figure 6:
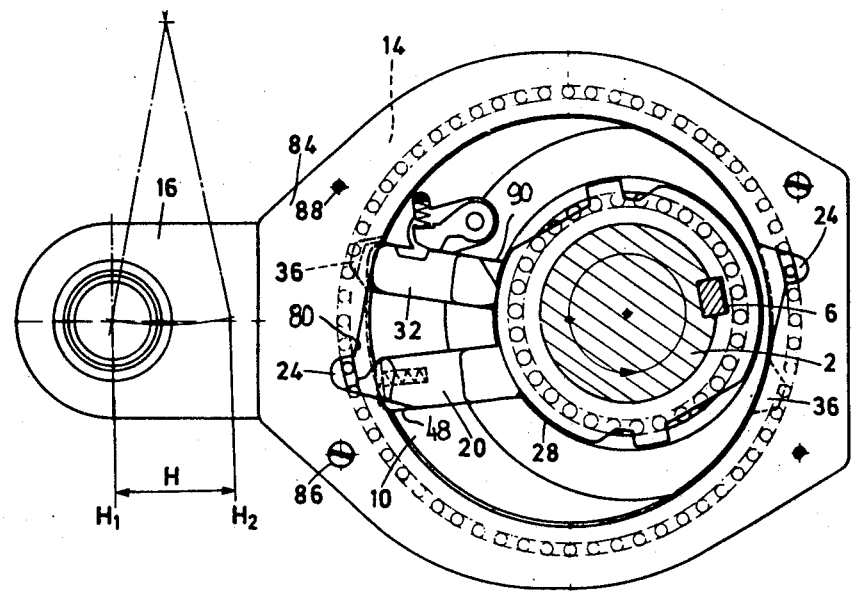
FIGS. 6 to 12 illustrate the coupling arrangement of FIG. 1 in different coupling phases, with the shifting ring deleted.

In FIG. 6 the coupling arrangement is shown in the phase where the drive shaft 2 is freely rotatable and the coupling and retaining keys 20, 32 are engaged in the radially outer recesses 24, 36 associated with connecting member 14. In this phase, the eccentric hoop 10 connected with the connecting member 14, is held securely against rotation with the drive shaft. In this position, the shifting ring does not need to perform any function because the coupling key rests with its inner end face at the drive shaft 2 and, accordingly, is secured against disengagement from the retaining recess 24 in the connecting member.

Figure 7:
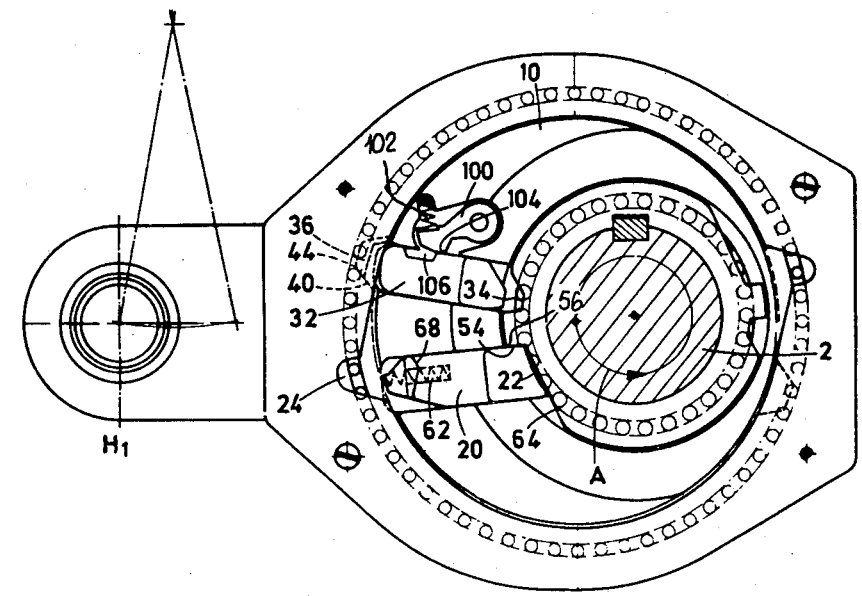
Figure 8:
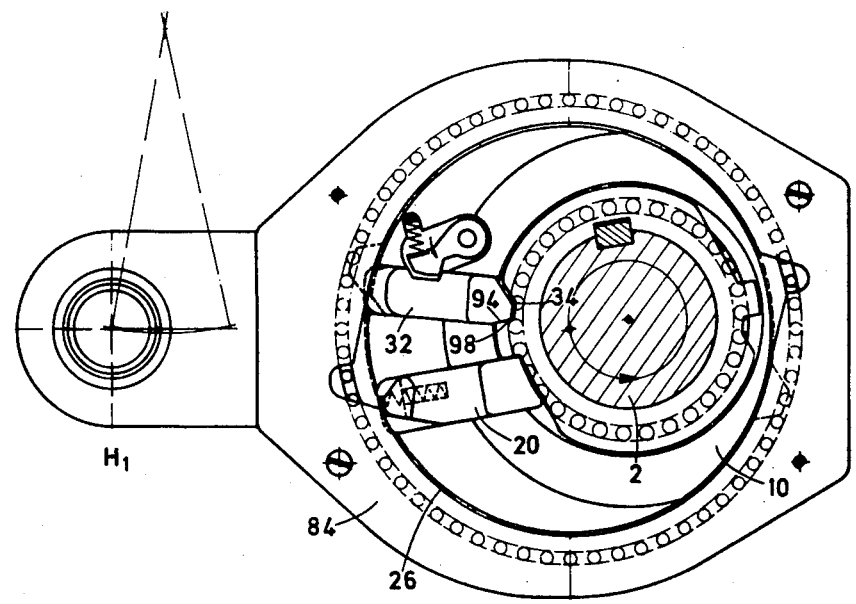

In FIGS. 7 and 8, the coupling arrangement is shown when the shifting ring 30 is placed in the position $S_2$, note FIG. 1, with the control cams 70 on the shifting ring acting on the driver cam 68 of the coupling key 20 and releasing it from the engaged position with the coupling recess 24. Accordingly, the coupling key 20, biased by the spring 62, moves along the lead cam 28 and enters onto the tangential feed-side surface 64 into the radially inner coupling recess 22 with its coupling side 54 disposed in contact with the corresponding coupling side 56 in the coupling recess 22. At the same time, retaining key 32 is held in the radially outer retaining recess 36 by the pawl 100 and with the coupling key in the radially inner coupling recess 22, the retaining key is aligned with the radially inner retaining recess 34. If the drive shaft 2 continues to rotate in the drive direction A, the eccentric hoop 10 is carried along with the drive shaft by virtue of the engagement of the coupling key 20 in the coupling recess 22. As a result, the retaining key is also carried along by the eccentric hoop and its radially outer control surface 40, juxtaposed to the control surface 44 in the retaining recess 36, is displaced out of the recess. With its displacement radially inwardly, the retaining key is directed against the drive shaft and moves into the corresponding radially inner retaining recess 34. During such movement, pawl 100 with its nose 104 seats within the recess 106 in the side of the retaining key and biases the key into the retaining recess 34. The radially inner force application side 94 of the retaining key 32 interacts with the juxtaposed side 98 of the retaining recess 34 and prevents any play between the drive shaft 2 and the eccentric hoop 10. During the movement of the eccentric hoop coupled with the drive shaft from the position shown in FIG. 8 with the connecting member 14 in position $H_1$, the connecting member is moved into position $H_2$, note FIG. 9, with the outer end face of the coupling key 20 disposed in contact with the lead cam 26 on the ring 84 and the outer end face of the retaining key 32 is located alongside the lead cam 26 in the ring 112 so that disengagement of the coupling key 20 and the retaining key 32 is prevented.

Figure 9:
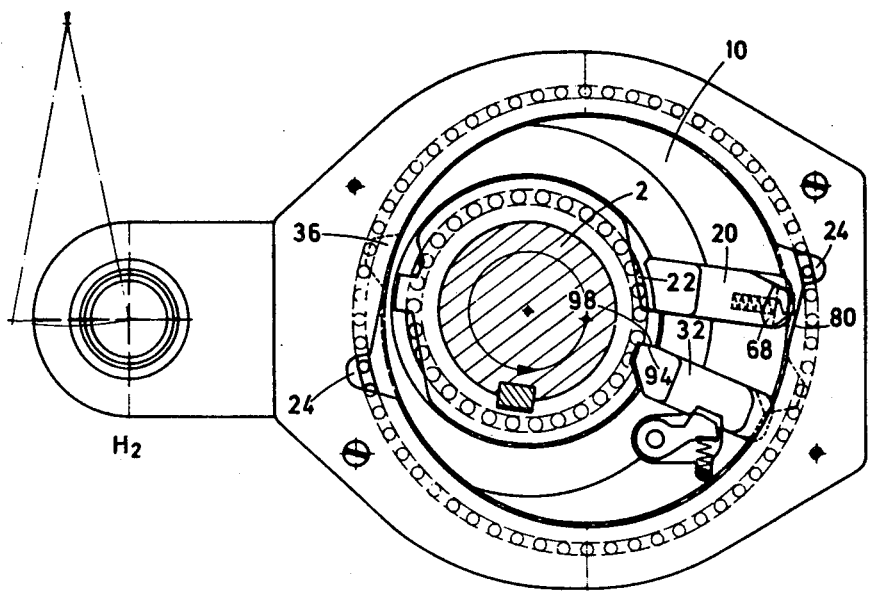
Figure 10:
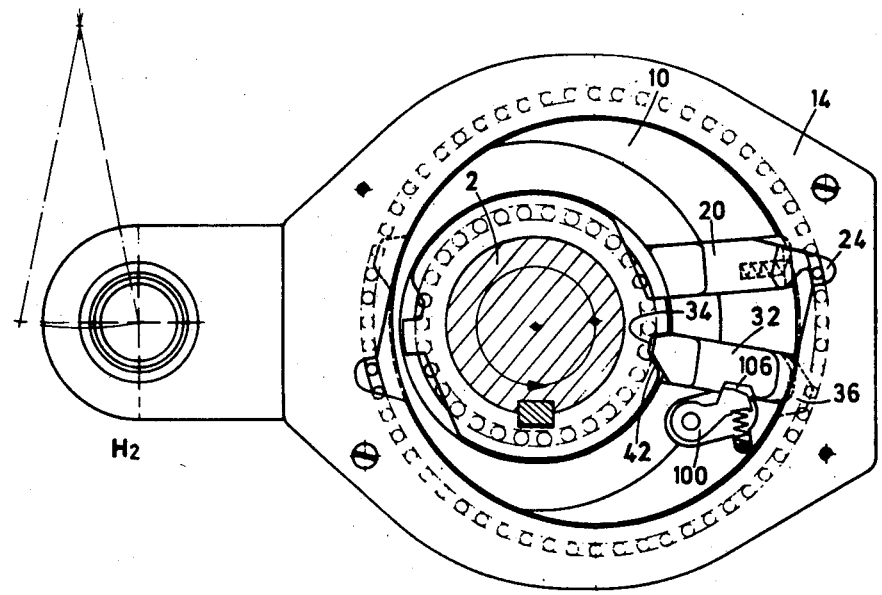
Figure 11:
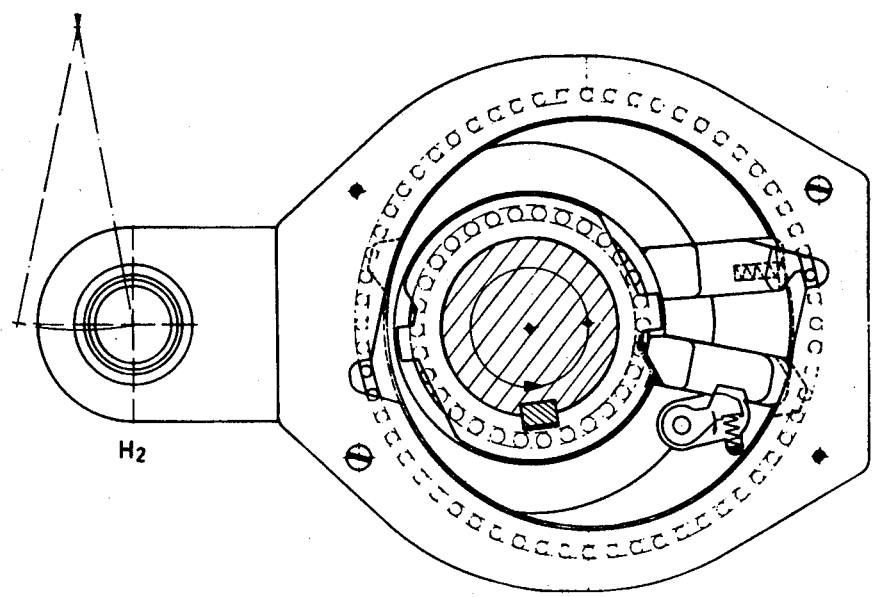
Figure 12:
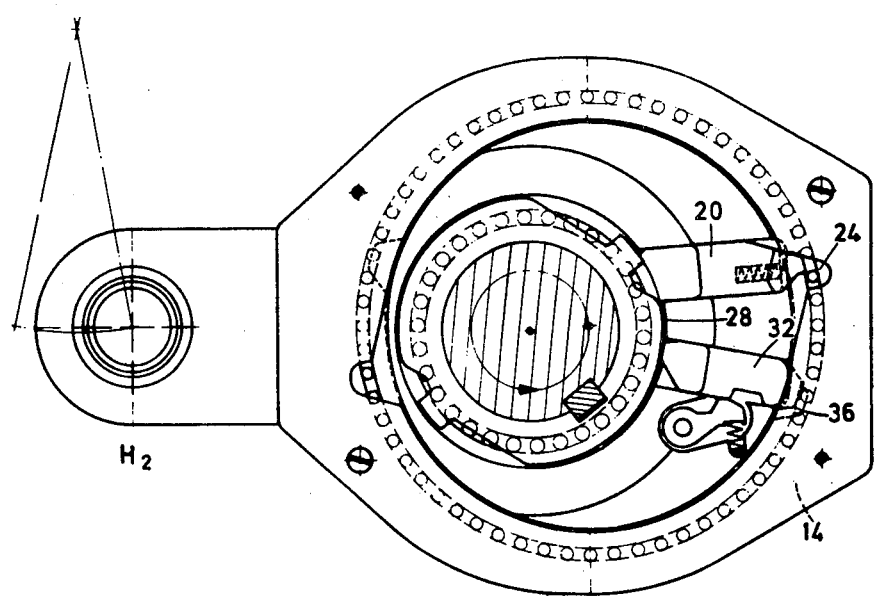

If the shift key 30 is in the second or rightward shifted position $S_2$, note FIG. 1, the coupling key 20 is released as shown in FIGS. 9 to 12. During this phase of the operation, control cam 70 on the shifting ring 30 interacts with the driver cam 68 on the coupling key 20 and displaces the key out of the coupling recess 22 which afforded interengagement with the drive shaft 2. In view of the tangential feed-side surface 80 in the coupling recess 24, the releasing action takes place gradually, as can be seen in FIGS. 9 and 10. Since the drive shaft is 2 is braked during this disengagement operation, the eccentric hoop 10 has the tendency, under the influence of the mass forces, to overtake the drive shaft. Such tendency is prevented by retaining key 32 with its radially inner force application side 94 located next to the corresponding side 98 of the retaining recess 34. In this way, it is possible to release the coupling key 20 out of the coupling recess 22 without causing jamming. As soon as the coupling key is completely released, as shown in FIG. 10, the coupling key engages in the radially outer coupling recess 24 associated with the connecting member 14 and continued rotation of the eccentric hoop 10 is prevented. Further, this action has the effect that the drive shaft 2, by means of its control surface 42, displaces the retaining key 32 out of the radially inner retaining recess 34 and displaces the retaining key into the radially outer retaining recess 36 so that it is now in contact with connecting member 14. At the same time, pawl 100 is displaced out of the recess 106 in the side of the retaining key 32 with the biasing action directing the retaining key inwardly against the drive shaft being overcome and the biasing action acting perpendicularly against the retaining key, note FIGS. 11 and 12.

In this phase of the operation of the coupling arrangement, the drive shaft 2 can continue to rotate freely, since the coupling key 20 and the retaining key 32 are held by the lead cam 28 so that they cannot move out of the radially outer coupling recess 24 or retaining recess 36 associated with the connecting member 14. Accordingly, a new coupling work-cycle can begin, as shown in FIGS. 6 to 12, but with the eccentric hoop rotated through 180°.

The following shifting conditions are possible:

(A1) If the shifting ring 30 is placed in the first shifted position $S_1$, the connecting member 14 assumes position $H_1$ or it remains in that position;

(A2) If the shifting ring 30 is moved into the second shifted position $S_2$, the connecting member 14 assumes the position $H_2$ or remains in that position.

Figure 13:
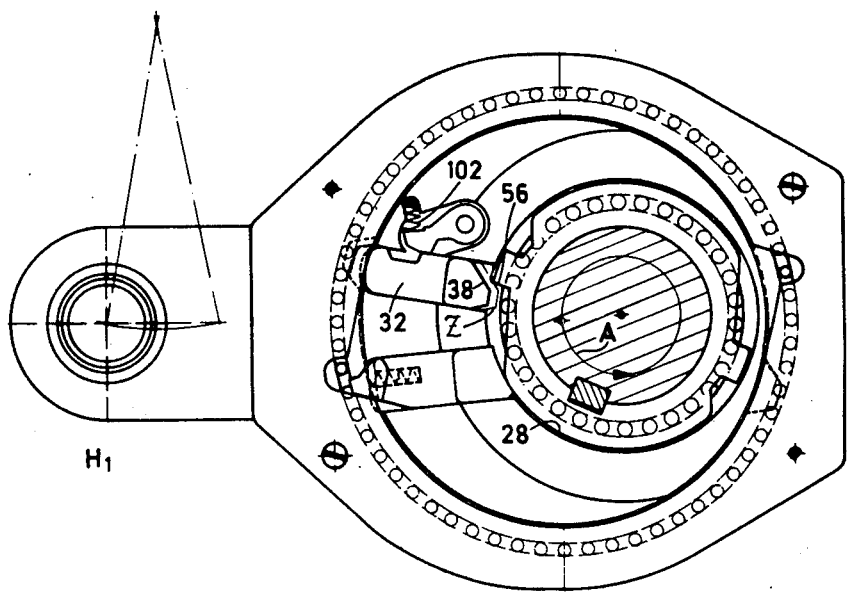
FIG. 13 shows the displacement of the retaining key moved unintentionally into the desired position.

In FIG. 13 an almost improbable position is displayed where the retaining key could accidentally, such as due to the rupture of the spring 102, be displaced into the Z position shown in phantom lines. In such an occurrence, the coupling surface 56 in the coupling recess 22 would interact with the control surface 38 on the retaining key 32 so that the key would, without sustaining damages, be displaced back into its assigned position.

As mentioned above, a control device 78 controls the shifting ring 30 for instance by means of a pattern device, known per se. The control device 78 can be mechanically actuated or in the form of a pneumatic piston-cylinder unit actuated by the pattern device. A control device which is electromagnetic is particularly advantageous wherein the control pulses can be generated electrically by a storage unit, a magnetic tape or another pulse transmitter.

A preferred control device is shown in FIGS. 1, 14, 15 and 16. This control device 78 has a drive shaft 116 rotatably supported on a machine frame 114. A rocking lever 118 is fixed to the shaft 116 and pivots back and forth once for each cycle of the shedding unit, not shown. The rocking lever 118 has a drive surface 120 which interacts with a step 122 on the shifting ring 30 and moves the shifting ring against the initial biasing force of a spring 124, from a first shifted position $S_1$ in the direction X to a second shifted position $S_2$. At the rocking lever 118, a pawl 128 is pivoted on a bolt 126 located almost diametrically opposite the drive surface 120. Pawl 128 faces toward the shifting ring and interacts by means of a projection 130 with a notch 132 in the shifting ring 30 in a manner to be described below. Pawl 128 has an abutting surface 134 which interacts with an abutting surface 136 on the shifting ring 30 and the pawl and the shifting ring are moved relative to one another. An oblong hole 138 is located in the pawl 128 and a bolt 140 is located in the oblong hole and is connected with an intermediate lever 142 pivotally supported at a stationary pin 144 and biased by a spring 146 toward the pawl 128.

The intermediate lever 142 interacts with an electromagnetic control part 148 which can be set by means of adjustment screws 150 relative to the intermediate lever 142. Control pulses are fed from a pattern device, not shown, for instance an electronic storage unit, a magnetic tape control or the like, to the control part 148 by means of lines 152. The retaining force of the electromagnetic control part 148 is greater than the initial stress on the pawl 128 generated by the spring 146, if the intermediate lever 142 is in contact with the control part 148. The initial biasing action generated by the spring 146 may, however, be larger or smaller than the initial power of the electromagnetic control part 148 when the pawl 128 rests at the shifting ring 30, that is, when the intermediate lever 142 is removed from the control part 148.

Figure 16:
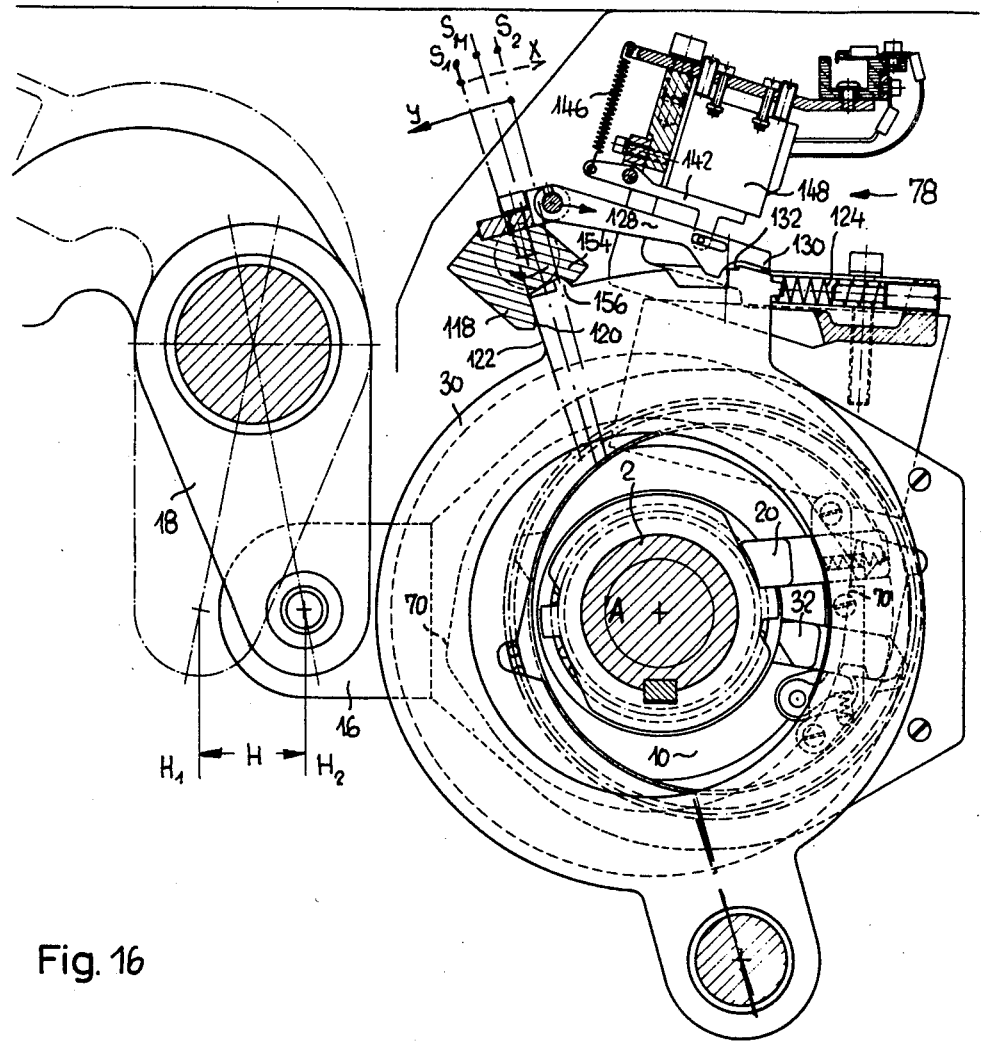
FIG. 16 is a side view of the coupling arrangement displayed in FIG. 1 with the shifting ring in the first shifted position.
Figure 17:
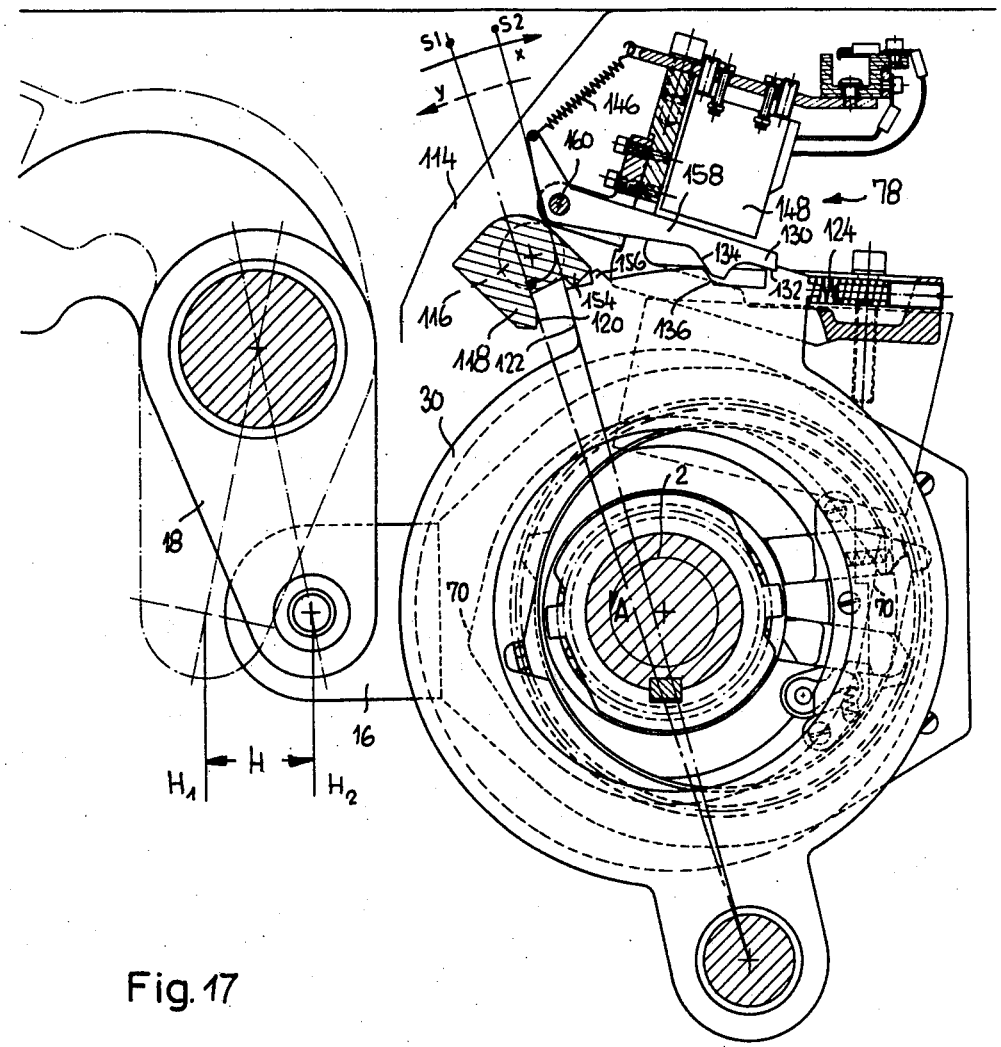
FIG. 17 shows the coupling arrangement such as in FIG. 1, however, with a modified control device.
Figure 18:
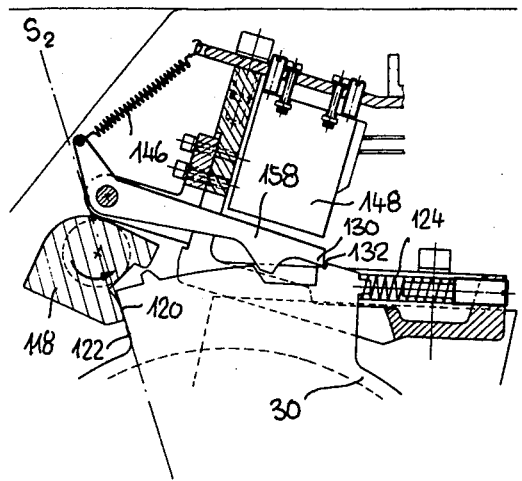
FIGS. 18 and 19 illustrate the modified control device of FIG. 17 in detail and in different control phases.
Figure 19:
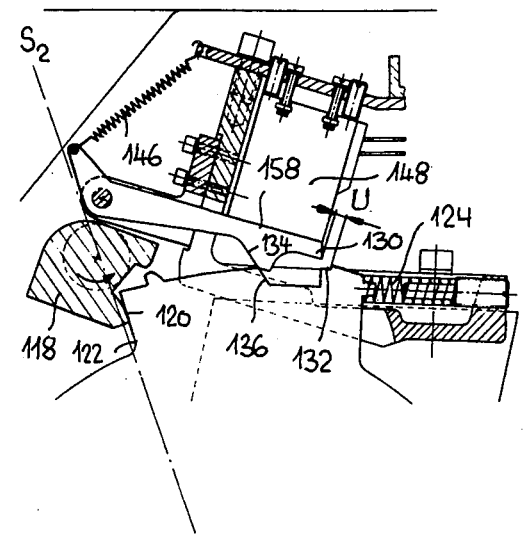
Figure 20:
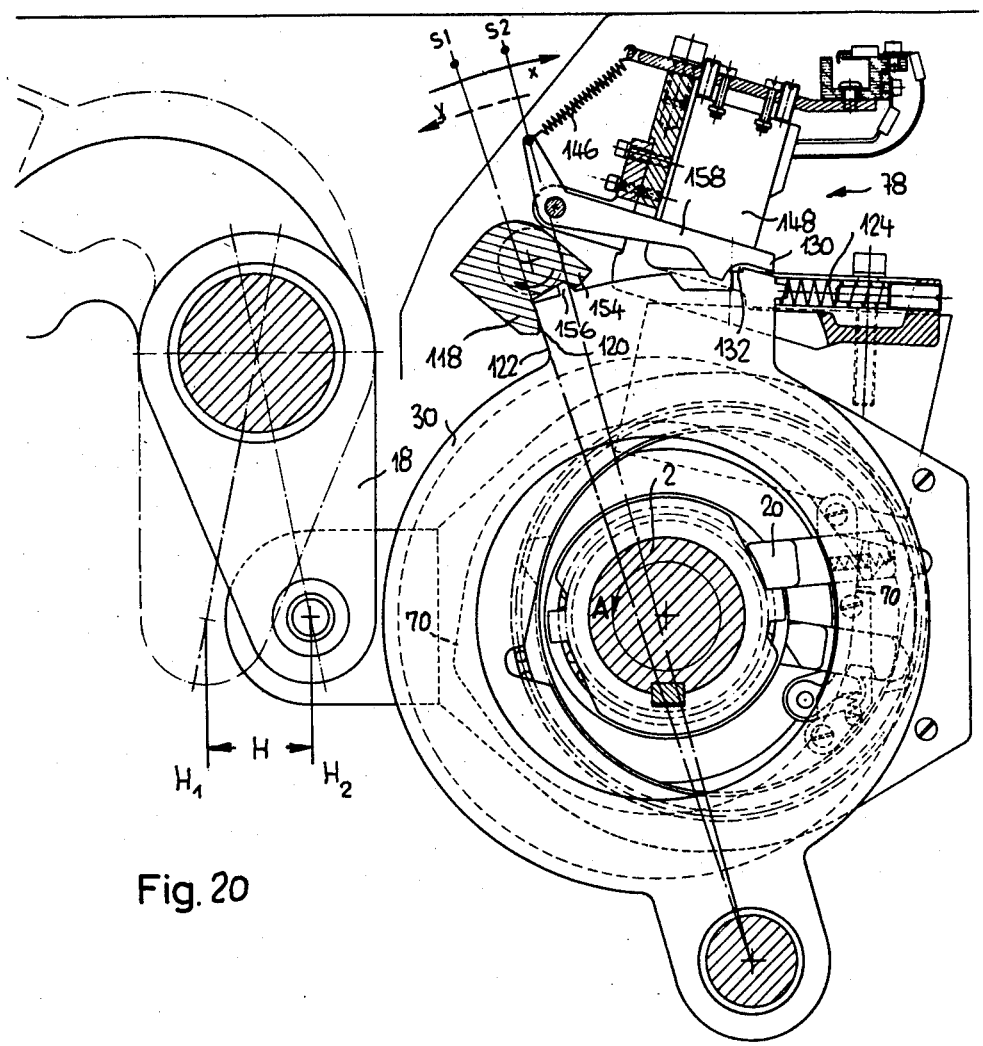
FIG. 20 is a view similar to FIG. 17, however, the shifting ring is in the first shifted position.

The rocking lever 118 also includes a stop cam 154 which interacts with a shoulder 156 on the shifting ring 30 when the rocking lever 118 and the shifting ring 30 assume the first shifted position $S_1$, as shown in FIG. 16.

The control device functions in the following manner:

FIG. 1 shows the phase in which the rocking lever 118 and the shifting ring 30 assume the first, leftward shifted position $S_1$. In the illustrated embodiment, control part 148 is activated and firmly holds the intermediate lever 142 against the initial biasing action of the spring 146, so that the pawl 128 is lifted and the projection 130 cannot interact with the notch 132 in the shifting ring 30. In this position, the stop cam 154 of the rocking lever 118 rests at the shoulder 156 of the shifting ring 30 and prevents yielding of the shifting ring from the driving surface 120 against the initial biasing action of the spring 124. As a consequence, shifting ring 30 is secured in the form-locking manner against a possible shifting load of the coupling key 20. In this shifted position, the control cam 70 of the shifting ring 30 releases the coupling key 20 by means of the engagement cam 68 so that the coupling key is engaged, as is shown in FIG. 16. The eccentric hoop 10 it taken along by the coupling key 20 and the retaining key 32 as well as the drive shaft 2 and is again newly controlled or affected by the shifting ring 30 in the position $H_1$. If the eccentric hoop 10 with the coupling key 20 is already in the position $H_1$, as shown in FIG. 6, then the control cam of the shifting ring 30 would not release the coupling key 20 and the coupling key would remain the disengaged position. The drive shaft 2 continues to rotate uncoupled, as shown in FIG. 6.

Figure 14:
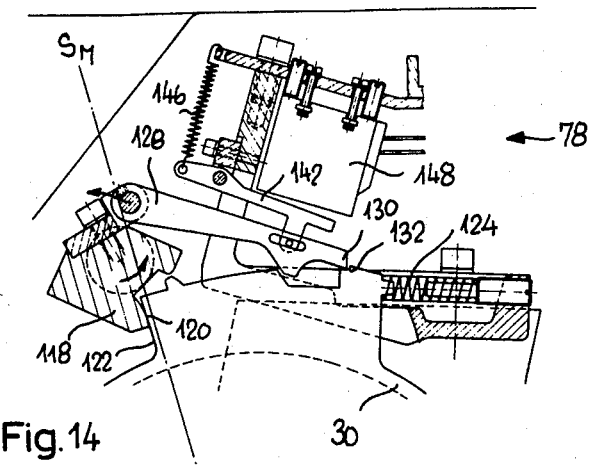
FIGS. 14 and 15 are views illustrating the control device of FIG. 1 in detail and in different control phases.
Figure 15:
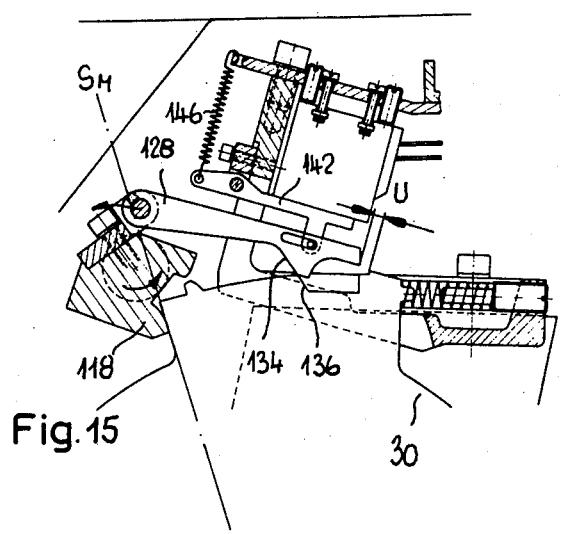

When the rocking lever 118 swings to the right, the shifting ring 30 is moved by the drive surface 120 against the biasing action of the spring 124 in the direction X up to the center position SM, as shown in FIG. 14. When the control part 148 is not activated, the pawl 128 rests under the influence of the spring 146 at the shifting ring 30 and can engage with its projection 130 into the notch 132. As the rocking lever pivots further, the pawl is taken back in the direction of movement of the shifting ring 30 by the mass U, whereby the abutment surface 134 on the pawl 128 runs up on the abutment surface 136 of the shifting ring 30 and brings the pawl 128 and consequently the intermediate lever 142 into contact with the control part 148, as shown in FIG. 15. When the control part 148 is activated, the intermediate lever 142 remains suspended at the control part and the shifting ring 30 remains in the first shifted position $S_1$ during return pivoting of the lever 118 in direction Y, as shown in FIG. 16.

When the center SM of the control part 148 is not activated, then the pawl 128 again engages with the shifting ring 30 under the action of the spring 146 during further pivoting of the rocking lever so that the projection 130 of the pawl can engage into the notch 132 of the shifting ring 30. During return pivoting of the rocking lever 18 in the first shifted position $S_1$, the pawl 128 performs an opposite movement and reaches, due to the engagement with the shifting ring, against the biasing action of the spring 124, the second shifted position S₂, shown in FIG. 1. Accordingly, the connecting member 14 moves from the position H₁ to the position H₂ or remains in position H₂ if it is already in that position before the shifting process, as shown in FIG. 1. The engagement between the pawl 128 and the notch 132 of the shifting ring 30 by means of the projection 130 effects a form-locking connection which acts against a possible shifting force of the coupling key so that accidental shifting is prevented.

In the embodiment of the control device illustrated in FIGS. 1, 14, 15 and 16, there is the advantage that the control decision takes place in a central shifted position SM so that the pivot distance of the rocking lever 118 can be kept relatively small which has an advantageous effect on a high driving speed.

FIGS. 17 to 20 show a modified control device where the parts identical with those of the control device of FIGS. 1, 14, 15 and 16 are provided with the same reference numerals. Contrary to the control device of FIGS. 1, 14, 15 and 16, the modified control device of FIGS. 17 to 20 has a pawl 158 rotatably supported on a pin 160 fixed to the machine frame 114. Pawl 158 is biased by a spring 146 toward the shifting ring 30 and interacts directly, that is, without an intermediate lever, with the control part 148. Since the pawl 158 performs only a pivoting motion and does not move in the direction of the shifting distance of the shifting ring 30, the rocking lever 118 must cover a larger pivot distance than in the above-mentioned example in order to move the shifting ring back and forth between the shifted positions S₁ and S₂ and to bring the pawl 158 into contact with the control part 148 as shown in FIGS. 17 to 20. The central shifting position SM contained in the first described embodiment is not provided in this embodiment. Otherwise, however, this control device corresponds in its function to the above-described control device.

The advantage of the second embodiment of the control device involves, in particular, a smaller number of parts, because the intermediate lever 142 in the first described embodiment is omitted. In addition, the shifting ring 30 does not carry out any pivot motion when it is held in a second shifted position S₂, that is, when the control part 148 is not activated.

While specific embodiments of the invention have been shown and described in detail to illustrate the application of the inventive principles, it will be understood that the invention may be embodied otherwise without departing from such principles.

I claim:
1. Coupling arrangement such as for a textile machine, comprising a first drive shaft capable of intermittent rotation about the axis thereof, an eccentric hoop extending around said drive shaft, a connecting member extending around said drive shaft with said eccentric hoop located between said drive shaft and said connecting member with said connecting member supported on said eccentric hoop, a coupling part movably guided on said eccentric hoop for movement approximately radially of said drive shaft, a first coupling recess associated with said drive shaft, a second coupling recess associated with said connecting member with said first coupling recess located radially inwardly from said second coupling recess, a shifting member arranged to displace said coupling part alternately between engagement with said first coupling recess and said second coupling recess, lead cams for guiding said coupling part and retaining said coupling part in one of said first and second recesses into which it is displaced, said shifting member supported eccentrically relative to said drive shaft and arranged to be pivoted about the support between a first position and a second position, a spring biasing said shifting member into the first position, and a control device for pivoting said shifting member between the first and second position wherein the improvement comprises a machine frame, said control device includes a second drive shaft rotatably mounted on said machine frame, a rocking lever fixed to said second drive shaft for rotation therewith, said rocking lever having a driving surface thereon for engagement with said shifting member for displacing said shifting member from the first position to the second position against the biasing action of said spring, a control part, a pawl engageable with said shifting member against the biasing action of said spring so that said pawl depending on the state of said control part effects one of moving said shifting member into the second position, holding said shifting member in the second position and moving said shifting member into the first position.

2. A coupling arrangement, as set forth in claim 1, wherein a pin is fixed to said machine frame, and said pawl is rotatably supported on said pin.

3. A coupling arrangement, as set forth in claim 1, wherein a pin is positioned on said rocking lever, said pawl is pivotally supported on said pin, and said pin is located approximately diametrically across said rocking lever from said drive surface with respect to said second drive shaft.

4. A coupling arrangement, as set forth in claim 1, including means biasing said pawl toward said shifting member.

5. A coupling arrangement, as set forth in claim 1, wherein said control part is positionable relative to said pawl.

6. A coupling arrangement, as set forth in claim 1, wherein said control part is activated mechanically.

7. A coupling arrangement, as set forth in claim 1, wherein said control part is activated pneumatically.

8. A coupling arrangement, as set forth in claim 1, wherein said control part is electromagnetically operated and interacts directly with said pawl.

9. A coupling arrangement, as set forth in claim 1, wherein said control part is electromagnetically operated, and an intermediate element interacting between said control part and said pawl.

10. A coupling arrangement, as set forth in claims 8 or 9, wherein the retaining force of said electromagnetically operated control part is greater than the initial biasing action of said pawl toward said shifting member wherein the initial biasing action may be greater or less than the initial power of said electromagnetically operated control part when said pawl rests on said shifting ring.

11. A coupling arrangement, as set forth in claim 10, wherein an abutting surface on each of said shifting member and pawl, which, during a relative movement of said shifting member and said pawl effected by said rocking lever, moves one of said pawl and said intermediate member into contact with said electromagnetically operated control part while loosening the engagement with said shifting member.

12. A coupling arrangement, as set forth in claim 1, wherein a stop cam is connected to said rocking lever, so that when said shifting member and said rocking lever are in a first shifted position said stop cam interacts with a shoulder on said shifting ring and blocks said shifting ring against yielding in the direction toward a second shifted position.

13. A coupling arrangement, as set forth in claim 1, including a spring, said coupling part comprises a coupling key, said spring biasing said coupling key against said drive shaft and said coupling key has an engagement cam, and a control cam on said shifting ring engageable with said engagement cam and acting against the biasing action of said spring.

14. A coupling arrangement, as set forth in claim 13, including an automatically shiftable retaining key mounted on said eccentric hoop and arranged independently of and spaced from said coupling key, said retaining key being slidable at least approximately radially relative to said drive shaft, at least one retaining recess in said drive shaft and at least one retaining recess associated with said connecting member with said retaining key being engageable in one or the other of said retaining recesses, and control surfaces formed on at least one of said retaining key and in said recesses for effecting a displacement of said retaining key out of said recesses when said drive shaft overtakes said eccentric hoop or said eccentric hoop overtakes said connecting member and when said retaining key is aligned with said recesses.

* * * * *